United States Patent
Hopkins et al.

(10) Patent No.: US 10,735,299 B2
(45) Date of Patent: *Aug. 4, 2020

(54) MANAGEMENT OF CONNECTIONS OF A CLIENT APPLICATION INCLUDING SERVER SELECTION

(71) Applicant: International Business Machines Corporation, Armonk, NY (US)

(72) Inventors: Graham David Hopkins, Hursley (GB); Timothy Jonathan Quigly, Hursley (GB); Luke David Charles Saker, Hursley (GB); Craig H. Stirling, Hursley (GB); Matthew B. White, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,123

(22) Filed: Oct. 25, 2018

(65) Prior Publication Data

US 2019/0068480 A1 Feb. 28, 2019

Related U.S. Application Data

(63) Continuation of application No. 15/075,783, filed on Mar. 21, 2016, now Pat. No. 10,129,130.

(51) Int. Cl.
*H04L 12/26* (2006.01)
*H04L 29/06* (2006.01)
*G06F 9/445* (2018.01)

(52) U.S. Cl.
CPC .......... *H04L 43/14* (2013.01); *G06F 9/44505* (2013.01); *H04L 43/00* (2013.01);
(Continued)

(58) Field of Classification Search
CPC . H04L 43/00; H04L 41/5009; H04L 43/0882; H04L 41/042; H04L 43/04;
(Continued)

(56) References Cited

U.S. PATENT DOCUMENTS 8,910,185 B2 12/2014 Dixon et al.
9,652,971 B1 5/2017 Trundle
(Continued)

OTHER PUBLICATIONS

List of IBM Patents or Patent Applications Treated as Related, Mar. 13, 2019, 2 pages.

*Primary Examiner* — Chirag R Patel
(74) *Attorney, Agent, or Firm* — Heslin Rothenberg Farley & Mesiti P.C.; Alexander Jochym, Esq.

(57) ABSTRACT

Managing connections for execution of a client software application. A client software application is analyzed before execution of the application using code analysis and, optionally non-functional metadata analysis, of the application to determine one or more classifications of operations of the application. A mapping of application operation classifications to server characteristics suited to the application operation classifications is maintained. Multiple servers currently available to process at least a portion of the client software application may be monitored, and each of the multiple servers may be characterized according to their performance and resources. The classifications of operations of the analyzed application may be compared to the characteristics of the multiple servers currently available using the mapping, and a server may be selected based on the comparison.

16 Claims, 7 Drawing Sheets

(52) U.S. Cl.
CPC ...... *H04L 43/0817* (2013.01); *H04L 63/1416* (2013.01); *H04L 43/04* (2013.01)

(58) Field of Classification Search
CPC . H04L 43/0817; H04L 43/14; H04L 63/1416; G06F 9/44505
See application file for complete search history.

(56) References Cited

U.S. PATENT DOCUMENTS

| | | |
|---|---|---|
| 10,129,130 B2 | 11/2018 | Hopkins et al. |
| 2007/0143460 A1 | 6/2007 | Ben-David et al. |
| 2012/0030516 A1 | 2/2012 | De Keukelaere et al. |
| 2012/0226478 A1 | 9/2012 | Bender et al. |
| 2012/0290639 A1 | 11/2012 | Schofield et al. |
| 2012/0304179 A1 | 11/2012 | Devarakonda et al. |
| 2014/0006614 A1 | 1/2014 | Bali et al. |
| 2014/0095693 A1* | 4/2014 | Apte .................. H04L 67/1008 709/224 |
| 2014/0214996 A1* | 7/2014 | Tamas .................. G06F 9/5038 709/212 |
| 2014/0282424 A1* | 9/2014 | Sheridan ............. G06F 11/3604 717/127 |
| 2015/0006643 A1 | 1/2015 | Basavanna et al. |
| 2016/0080229 A1* | 3/2016 | Kobayashi ............. H04L 43/04 709/224 |
| 2016/0099963 A1 | 4/2016 | Mahaffey et al. |
| 2016/0226966 A1* | 8/2016 | Lin ..................... H04L 67/1021 |

\* cited by examiner

MANAGEMENT OF CONNECTIONS OF A CLIENT APPLICATION INCLUDING SERVER SELECTION

BACKGROUND

One or more aspects of the present invention relate to the field of client side management of connections, and more specifically, to management of connections for a client application including server selection.

Distributed computing enables software components located on networked computers to communicate and coordinate actions by passing messages. Distributed computing may use a client server model in which a software application at a client may have some portions of its operations and functions executed by external resources provided at one or more servers.

A messaging environment provides the capability to provide common services between applications executing on disparate computing systems in different locations. Messaging environments may be used to facilitate requests from client applications for execution by external resources provided by one or more servers.

Performance characteristics of a server can be affected by many aspects including concepts such as the type of attached storage, network latency, and general load. Different functional requests placed on a server may require or benefit from different characteristics. Therefore different servers may handle client application requests with non-uniform performance.

SUMMARY

Shortcomings of the prior art are overcome and additional advantages are provided through the provision of a computer-implemented method of managing connections for execution of a client software application. The computer-implemented method includes analyzing, by a processor, an application before execution of the application, the application being a client software application, and the analyzing using code analysis of the application to determine one or more classifications of operations of the application; maintaining a mapping of application operation classifications to server characteristics suited to the application operation classifications; monitoring multiple servers currently available to process at least a portion of the application and characterizing the multiple servers according to their performance and resources; comparing the classifications of operations of the analyzed application to the characteristics of the multiple servers currently available using the mapping; and selecting a server based on the comparison.

As an example, the analyzing the client software application before execution using code analysis includes one or more of: static code analysis, byte code analysis, code injection analysis, or application programing interface analysis.

In a further example, the analyzing the client software application uses non-functional metadata analysis.

The non-functional metadata analysis includes, e.g., one or more of: analysis of deployment descriptors, analysis of source code annotations, or analysis of service level agreements.

In yet a further example, the analyzing the client software application before execution includes interpreting code to determine one or more classifications of functional operations of the application.

The classifications of operations include, e.g., one or more of: a type of operation, a type of messaging for the operations of the application, a security level of the operations, encryption and security used by the operations, or business priority of the operations.

As one example, the monitoring multiple servers currently available to process at least a portion of the application includes at least one of: receiving monitored statistics from a remote monitoring service, or monitoring, at a client device that includes the processor, to include client-specific server characteristics.

In another example, the monitoring multiple servers currently available to process at least a portion of the application includes maintaining statistics relating to multiple server characteristics.

As an example, the maintaining the mapping of application operation classifications to server characteristics suited to the application operation classifications includes one or more mappings of: persistent messaging operations to servers with fast disk access; transactional messaging operations to similar servers; non-persistent messaging operations to high capacity network links; security or encryption operations to server dedicated security hardware; concurrent operations to servers with highly parallel processors; low priority business operations to systems with low redundancy; or critical business operations to highly secure, scalable, high-performance servers.

Further, the maintaining the mapping of application operation classifications to server characteristics suited to the application operation classifications may include configuring prioritization of server characteristics for applications with more than one operation classification.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Various software applications and software programs may execute within distributed computing systems, such as grid computers, computing clusters, and cloud-computing systems. Application execution may include combinations of code and application programming interfaces (API) which execute on a client device and other code and APIs that utilize one or more other computing devices such as servers. The software code and APIs that access and utilize resources that exist within servers are accessible via network connections (e.g., a client-server architecture).

Communications between the client and the server are generally processed by a messaging system. However, the client device may select the server that includes the resources or information that the client requires for access by transactions, operations and remote procedure calls.

Aspects of the described method and system provide management of connections for execution of a client software application based on analysis of the application before it is executed. The analysis may classify operations of the application and these may be mapped to characteristics of available servers in order to select an appropriate server for execution of the application or a portion of the application.

To perform messaging, different APIs or calls will be made by the applications. Examples could be put-message, get-message, browse-messages, commit, rollback. The client applications are analyzed regarding the specific APIs that are used before the application executes. In addition, metadata or annotations associated with the application, including associated service level agreements, may be analyzed to determine operations and types of workload of the application. The metadata may include non-functional metadata providing information relating to the application beyond the functional operations of the application.

Applications and messaging clients may choose the server that has the best response for the type of workload of the application. For example, a server that has fast disks will be preferred for persistent transacted messaging. By tracking statistical measures of the servers, not only can new connections be chosen intelligently, but existing connections may be dropped if the statistics become unfavorable. Selection is made on the client side, so taking into account the overall system performance. For example, local network connections to the client could be such that a faster server might be disadvantaged. A faster connection to a comparatively slower server could be better overall.

Figure 1:
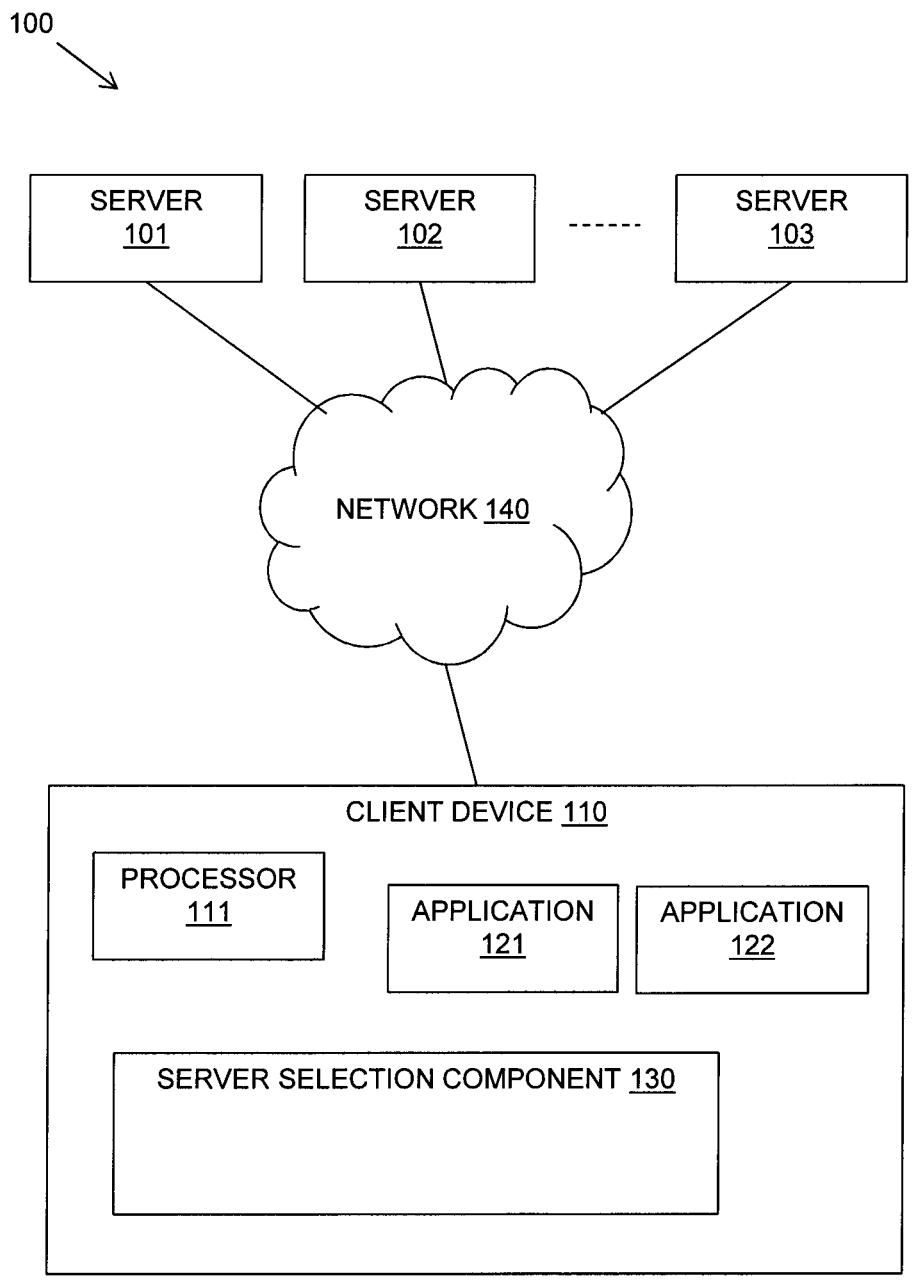
FIG. 1 is a schematic diagram of an example embodiment of a system in accordance with one or more aspects of the present invention.

FIG. 1 is a schematic block diagram illustrating an example embodiment of a distributed data processing environment 100. An embodiment of distributed data processing environment 100 includes multiple servers, illustrated by server 101, server 102, server 103, and client device 110, all interconnected over a network 140. Many modifications to the depicted environment may be made by those skilled in the art without departing from the scope of aspects of the invention.

Server 101, server 102, server 103, and client device 110 may be any suitable form of computing system. In certain embodiments, server 101, server 102, server 103, and client device 110 represent computer systems utilizing clustered computers and components (e.g., database server computers, application server computers, file server computer, network-attached storage devices, etc.) that act as a single pool of seamless resources when accessed through network 140, as is common in data centers and with cloud-computing applications.

In general, server 101, server 102, and server 103 are representative of any programmable electronic device or combination of programmable electronic devices capable of executing machine readable program instructions and communicating with client computers, such as client device 110, via network 140. Server 101, server 102, server 103, and client device 110 may include components, as depicted and described in further detail with respect to FIG. 4, in accordance with embodiments of the described system. Server 101, server 102, and server 103 include resources (not shown) that are utilized by the client device 110.

In one embodiment, client device 110, server 101, server 102, and server 103 communicate through a network 140. The network 140 may be, for example, a local area network (LAN), a telecommunications network, a wireless local area network (WLAN), a wide area network (WAN), such as the Internet, or any combination of the previous, and can include wired, wireless, or fiber optic connections. In general, network 140 may be any combination of connections and protocols that will support communications between client device 110 and a server. In another embodiment, the network 140 may operate locally via wired, wireless, or optical connections and can be any combination of connections and protocols (e.g., near field communication (NFC), laser, infrared, etc.).

In some embodiments, the network 140 may include one or more servers (not shown) that act as messaging servers and or queue managers that control the routing of server-side operations of applications 121, 122 executing on the client device 110. The network 140 may utilize one or more protocols to route server-side operations to server 101, server 102, and/or server 101. In some scenarios, message queuing is utilized to route server-side operations to server 101, server 102, and/or server 103 from client device 110 and return one or more results of the server-side operations to the respective applications executing on client device 110. For example, an open standard protocol for message-oriented middleware is advanced message queuing protocol (AMQP). In other embodiments, network 140 includes message-oriented middleware implemented via a hardware infrastructure or software infrastructure that supports sending and receiving messages between distributed systems and client device 110.

The client device 110 may include a processor 111, user interface (UI), file storage, database, and applications 121, 122 which may be formed of computer-readable instructions stored in memory. In addition, the described client device 110 includes a server selection component 130, which is described in further detail below with reference to FIG. 4.

Figure 2:
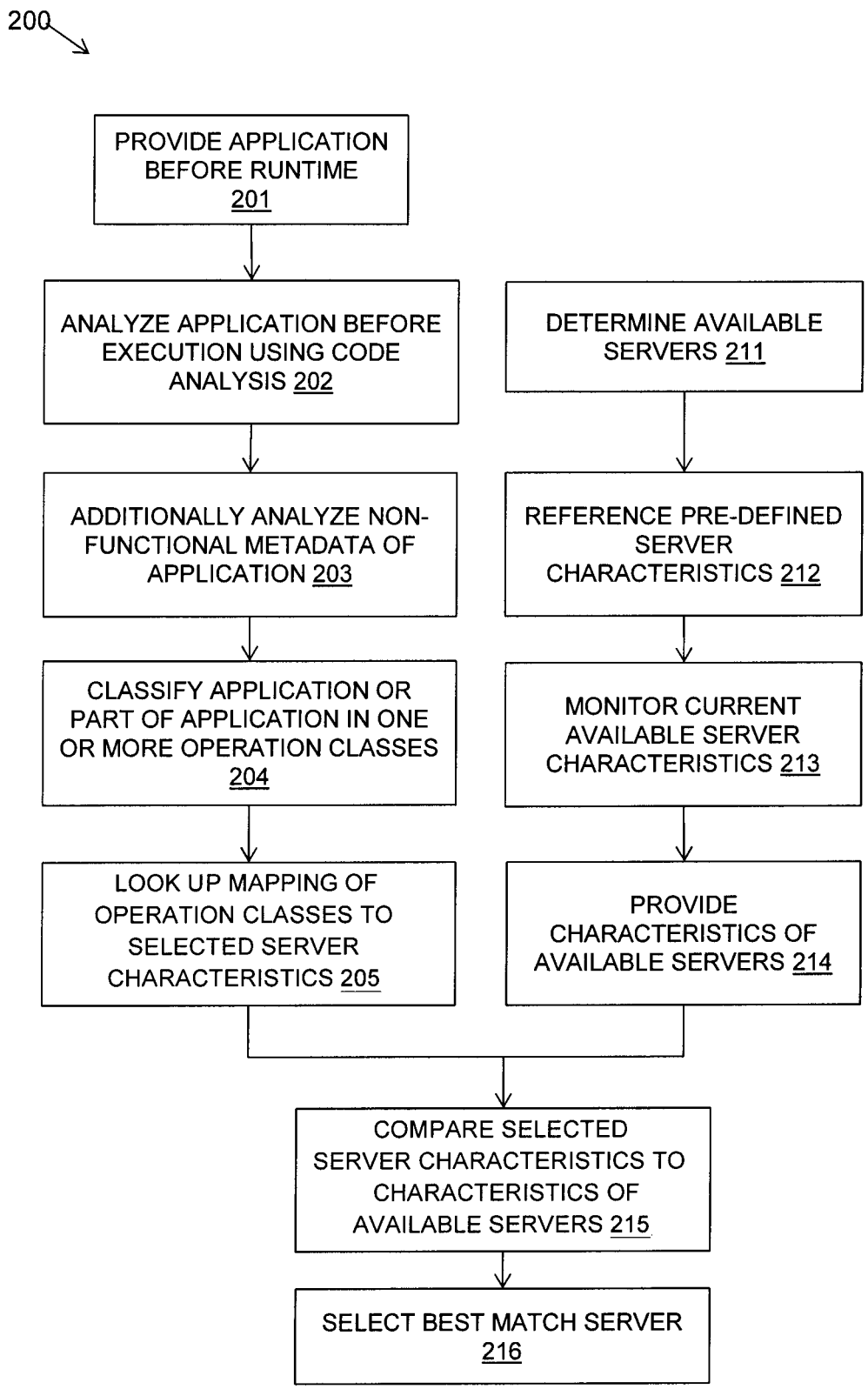
FIG. 2 is a flow diagram of an example embodiment of a method in accordance with one or more aspects of the present invention.

Referring to FIG. 2, a flow diagram 200 shows an example embodiment of aspects of the described method.

An application is provided 201 at a client system before it is executed. The application may have at least some portions of its operations executed by external resources provided by one or more servers.

The application is analyzed 202 before execution of the application on the client system. The analysis analyzes the code of the application utilizing one or more of static code analysis, byte code analysis, code injection analysis, and application programming interface analysis to determine functional operations of the application.

Additional analysis 203 of the application before execution may include analysis of non-functional metadata provided in the application or referencing the application. This may be provided by deployment descriptors, source code annotations, and information associated with the application such as service level agreements. The non-functional metadata may be provided by the application developer or the business to describe how the application should run or behave and business importance.

The application or portions of the application may be classified 204 according to operations and requirements of the application identified in the analysis. This classification may include interpreting the analysis of the application to relate to classes of operation of the application. For example, in the code analysis of the application, certain code or words may be identified as relating to a type of operation. The classification of operations may include functional and non-functional aspects of the operations.

A mapping or model may be provided 205 that maps or links operation classes of applications to server characteristics, such that favorable server characteristics for operation classes are identified. The mapping may be referenced for the operation classes of the current application or portions of the application to obtain selected (e.g., preferred) server characteristics for executing the application or portion thereof.

As a background process, servers available to the client system may be determined 211. This may be carried out continuously or at regular time periods, or when a change occurs in the server availability. The available servers may have pre-defined characteristics which do not change and which may be referenced 212. In addition, the available servers may have dynamic characteristics which may change such as workflow, availability, etc. The dynamic characteristics may be monitored 213 at the client side, for example, to identify comparative performance of each server of APIs and calls. The dynamic characteristics may have associated statistics built up by monitoring past processing behavior of the servers.

The server monitoring may be carried out remotely from the client device as a general service for multiple client devices. However, monitoring at the client device may also take place to include performance characteristics of the servers from the client perspective which may include network parameters specific to access of the servers from the client device.

The characteristics of the available servers may be provided 214 at the client system.

A comparison may be carried out 215 of the server characteristics required or desired by the current application or portion of the application according to the operation classification of the application and the available server characteristics in order to select 216 a best match of a server or servers to the current application or portion thereof.

For a given system, such as a messaging, it is possible to ascribe certain classes of operation of applications that particular servers might excel at. They might excel purely based on the hardware capabilities available to them. Examples of classes of operation which are mapped to server characteristics in this context are as follows:

Persistent messaging operations—servers with fast disk access;

Transactional messaging—similar servers;

Non-persistent messaging—high capacity network links;

Secure Socket Layer (SSL) and encryption—dedicated security hardware;

Concurrent operations—highly parallel CPU;

Low priority business—cheap commodity hardware or virtualized systems with little redundancy; and Critical business—a highly secure, scalable, high-performance server, for example, z/OS based (z/OS is a trademark of International Business Machines Corporation, Armonk, N.Y.).

Information obtained prior to application runtime is used to obtain characteristics of an application that may be evaluated as classifications of application operations. These characteristics can be used to help determine at runtime the appropriate choice of server to which the application should connect. Actual measured server performance at runtime is used together with similar application characteristics to dynamically determine and modify server choice.

As an example of a server, a messaging solution may allow applications to connect over a network to put and get messages from a destination. This put and get of messages can be done with various qualities of service; for example, they can be done under a transaction to permit recovery in the event of failure.

While each instance of a server may offer the same function, there could be conditions, such as hardware capability, network latency, etc. that would mean some servers are selected (e.g., preferred) for specific types of workload. As an example, messages put under a transaction might work more efficiently on a server that has very fast disk storage as transactional work is very heavily dependent on disk throughput. Messages that are not required to be persistent and not required to be under transactional control may function better on machines with more memory.

The application analysis carried out in the above method before execution of the application on the client system may be carried out by various methods and tools. As well as analyzing the software application functionality, descriptions of the application may be used to assign business importance to an application. The descriptions of the application may be provided by the application developer using annotation or metadata associated with operations of the application. In addition, any service level agreement associated with the application may also be used to assign business importance.

Various methods of analyzing the client software application and, optionally, associated information before it is executed are described.

JavaEE (Java and all Java-based trademarks and logos are trademarks of Oracle and/or its affiliates) applications typically use a form of deployment description (e.g., Extensible Markup Language (XML)) to describe the application. This can be analyzed with existing XML tooling. XML elements can be used to describe aspects of the application.

API based analysis may be used to provide a more direct method of determining the APIs in use. JMS being the open standard for Java API messaging defines an API. Aspects described above, such as persistence, are coded into the application in terms of which API they use and what parameters are passed.

Using Byte Code or static analysis of the application when compiled may be used to give information on the type of application. Code injection may also provide additional code that provides information.

Similar code or application annotation technology may be used. Annotations as part of the Java language are another type of metadata.

In addition to the built in content of the application, an application may have added descriptors.

Companies may have defined objectives in terms of response time, size of messages, persistent requirements etc. that are expressed in a Service Level Agreement (SLA). These SLAs, if codified correctly, may be utilized to give appropriate information regarding the application ahead of execution time.

Aspects of the described method and server define a choice of server based on application behavior determined by using methods of generating metadata about the application before it executes. This metadata may come from business decisions or application developers' stating the behavior in provided metadata. Alternatively, this may be provided from static analysis of the code to determine the APIs actually used before they get run.

This achieves value to clients by giving them better functional and non-functional performance. In addition, it allows them to improve their business by optimizing their business processes. This may include running the most critical business processes on expensive reliable systems, while others are run on less reliable systems.

All the example techniques below are aimed at determining the characteristics of applications before they are run such that a more intelligent choice of server can be made at the start of an applications runtime.

Deployment Descriptors

JavaEE applications typically use a form of deployment description (typically XML) to describe the application. This can be simply analyzed with existing XML tooling. XML elements can be used to describe aspects of the application.

A typical JavaEE application would contain a number of the Enterprise Java Beans (EJB) and these can be described using an ejb-jar.xml file. This uses XML to describe aspects of the EJB. An extract of one of these would be as follows. A number of elements have been highlighted to be referred to in the following description.

Example of Code for Analysis:

An application server will parse this file to know how to load and run the Message Driven Bean which is a special type of EJB that will invoke a specific interface on the code when a message arrives on a message queue.

Further elements of the ejb-jar.xml describe the details of how that message is to be obtained. Normally this information is used to establish a connection to the messaging server specified.

This information may be used in one or more aspects of the described method to help determine the specific server to connect to. The references to 'container' here are an indication of the transactional nature the messaging is required to have and therefore the application or portions of the application may be classified as having transactional operations.

Code Analysis

The application's use of APIs together with the options is a direct method of determining the application's characteristics. JMS being the open standard for Java API messaging defines an API.

Using byte code when compiled (in the case of suitable languages) or static code path analysis of the application source will give the information on the type of application which may be used to classify application operations. This can then feed into the choice of server to use.

There is a wide variety of established techniques that can be used to analyze both source and binary code. In the simplest case, specific APIs with certain options may be looked for in unit level static analysis in which analysis takes place within a specific program or subroutine, without connecting to the context of that program.

In a more complicated case, the code paths may be determined and together with the length may be used to determine the frequency of an API's calls and the potential size of messages using technology or system level static analysis in which analysis takes into account the interactions between unit programs. Again these are characteristics that can be used to determine server choice.

Extension to use of formal methods may be deployed to reason about the application; though in a practical context this is unlikely to be an economically viable solution but would be possible.

```
<display-name>WMQ_IVT_MDB</display-name>
<enterprise-beans>
    <message-driven>
        <display-name>WMQ_IVT_MDB</display-name>
        <ejb-name>WMQ_IVT_MDB</ejb-name>
        <ejb-class>ejbs.IVTMDB</ejb-class>
        <messaging-type>javax.jms.MessageListener</messaging-type>
        <transaction-type>Container</transaction-type>
        <message-destination-type>javax.jms.Queue</message-destination-type>
        <activation-config>
            <activation-config-property>
                <activation-config-property-name>
                    transportType</activation-config-property-name>
                <activation-config-property-value>
                    CLIENT</activation-config-property-value>
            </activation-config-property>
        </activation-config>
        <resource-ref>
            <description>WMQ IVT ConnectionFactory</description>
            <res-ref-name>IVTCF</res-ref-name>
            <res-type>javax.jms.ConnectionFactory</res-type>
            <res-auth>Container</res-auth>
        </resource-ref>
    </message-driven>
</enterprise-beans>
```

Code Injection

Within some systems, it is possible to inject or weave additional code in an application statically prior to runtime. The additional code may run to provide information. This may be referred to as Aspect Oriented Programming which adds behavior to existing code (an advice) without modifying the code itself, instead separately specifying which code is modified via a "pointcut" specification, such as "log all function calls when the function's name begins with 'set'". This allows behaviors that are not central to the business logic to be added to a program without cluttering the code core to the functionality.

Source Code Annotations

Similar code or application annotation technology may be used. Annotations that form part of the Java language are another type of metadata that may be used to express orthogonal concepts about an application.

For example, a Message Drive Bean may have the following metadata specified at the top of the source code.

Example Metadata Annotation:

```
/**
    * Message-Driven Bean implementation class for: BasicOneMDB
    */
@MessageDriven(activationConfig = {
        @ActivationConfigProperty(propertyName = "destinationType",
propertyValue = "javax.jms.Queue"),
        @ActivationConfigProperty(propertyName = "destination",
        propertyValue =
"JMS11Queue") }, mappedName = "JMS11TestQueue")
@TransactionAttribute(TransactionAttributeType.REQUIRED)
@TransactionManagement(TransactionManagementType.CONTAINER)
```

The reference to 'container' is the same as the reference in the ejb-jar.xml. These are samples of annotations that are defined in the JavaEE specifications. For other metadata, additional annotations could be defined.

Service Level Agreements

Companies will have defined objectives in terms of response time, size of messages, persistent requirements, etc. that are expressed in a Service Level Agreement (SLA). These SLAs, if codified correctly, can be utilized to give appropriate choices ahead of runtime.

Examples of SLA details that could be expressed are listed below. Note that these might not be limits but represented by a continuous function that represents increased $ cost as a function of time and the variable being measured.

* Message Rate (messages per second)
    ) Highest expected rate
    ) Lowest rate
    ) Profile of how the size changes over time (day, week, month, end of financial year, etc.)
* Message size
    ) Average, peak, low size
    ) Profile of how the size changes over time (day, week, month, end of financial year, etc.)
* Response time to message
    ) Average, highest, desired or selected response time
* Message delivery quality of service
    ) Transaction, level of persistence of data required Based on the example values given above, an SLA may be encoded in the following format assuming that the application is the MDB described above in relation to the deployment descriptors example. This is an example encoding and various different schemes may be used. This example is given in JavaScript Object Notation (JSON) format.

SLA Example Encoding:

```
{
    sla :    {
        application : {
            mdbs : [
                    {"ejb-name":"mdbIncoming"},
                    {"ejb-name":"mdbDatabase"}
            ]
            servlets : [
                    {"ejb-name":"UI_Alpha"},
                    {"ejb-name":"UI_beta"}
            ]
        }
        messageRate : {
            "max": "299",
            "min":"10",
            "mean":"45"
        }
        messageSize : {
            "max": "99",
            "min":"1",
            "mean":"45"
        }
        messageResponseTime : {
            "max": "299",
            "min":"20",
            "mean":"35",
            "costPerUnitOverLimit":"2.50"
        }
        qualityOfService : {
            "persistence" : "OnceOnly",
            "transacted" : "TwoPhase"
```

At the start of the above code there is a reference to the code that makes up the application. Following on from this there is a description of the values that could be used to make up the SLA. A "cost" field is also shown which may be used by any algorithm to determine the cost of breaking the limits set.

By looking at the SLAs it would be possible to determine server choice in order to minimize either the cost or to keep the overall system within the bounds of the SLA. Various mathematical techniques could be used to help determine which of the SLAs are desired (e.g., preferred).

Mission or business level static analysis takes into account the business/mission layer terms, rules and processes that are implemented within the software system for its operation as part of enterprise or program/mission layer activities. Such elements may be statically extracted and analyzed.

Figure 3:
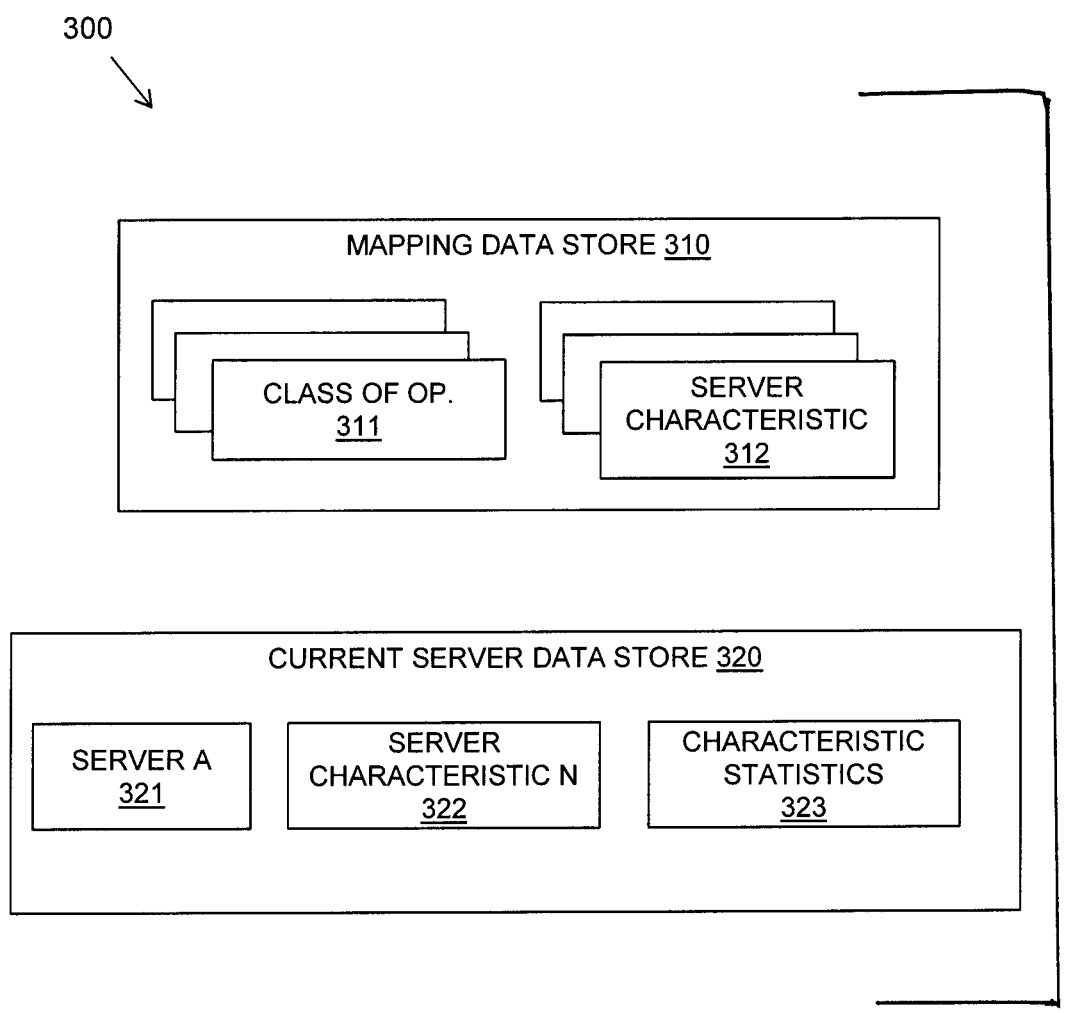
FIG. 3 is a schematic diagram illustrating an example embodiment of aspects of the present invention.

Referring to FIG. 3, a schematic diagram 300 shows example embodiments of aspects of the described method and system. A mapping data store 310 and a current server data store 320 are shown which may be provided as data stores at the client device or may be accessed remotely from another location via a network.

The mapping data store 310 is shown which stores mappings or models of classifications of operations 311 of applications as they relate to server characteristics 312. The mapping data store 310 may be built with additional classifications of operations 311 which may be functional classifications relating to the function of the application, or non-functional classifications relating to many forms of additional information which may affect the server selection, including business aspects, security aspects, priorities, etc. The non-functional additional information may be added to an application in the form of annotations or may be associated with an application, such as in a codified SLA. The mapping or model of classifications of operation may be configured to give priority to defined operation classes. In an embodiment, classifications of operations may have weightings determining their influence on the server characteristics or may have algorithms applied to combinations of classifications of operations in an application to determine the best server characteristics.

The server characteristics 312 in the mapping data store 310 may relate to any characteristics of a server, which may have an impact on or may affect the use of a server to execute an operation of an application. The current server data store 320 may maintain a record of currently available servers 321, their characteristics 322, and information and statistics relating to their characteristics 323. The statistics may be generated from past performance and responsiveness of the server and may be built up over time. The statistics may be used to weight a characteristic for a particular server.

In a simple example, a current server data store 320 may be a database table with the key being the server name, followed by the latest response time for persistent messaging, non-persistent messaging, etc.

More characteristics of the servers may be stored based on what specific items are been identified. In addition, historical data may be stored with the aim that responses over time may be retrieved and used as the basis for calculation of statistics relating to the characteristic 323. This may enable trends over time to be identified, historical minima/maxima, and expected deviation. The current server data store 320 may be queried to obtain a reasonable set of starting conditions by persisting the current state of the overall system.

The available servers may be identified by server names, host names, or resolved from IP addresses. Characteristics may be defined relative to resources of the servers (e.g., fast DASD, multiple processing cores, processing core speed, available RAM, etc.).

A look up to the mapping data store 310 may input one or more classifications of operations 311 of a current application to retrieve one or more server characteristics 312 for the current application. A look up of the current server data store 320 may input one or more server characteristics and may retrieve one or more servers, which may be weighted or listed according to the statistics of the characteristics.

Performance characteristics of a server may be different in processing different client applications due to factors, such as the type of attached storage, network latency, and general load. These characteristics are not uniform across different functional requests placed on a server and different servers may handle client application requests with non-uniform performance. This is accommodated by the mapping and maintained server characteristic statistics. In addition, classifications of operations of applications may be added to the mapping data store 310 to expand this for newly recognized or developed operation classifications.

Aspects of the method describe using analysis techniques on the client application software to additionally help make an informed choice as to which back-end server to use. This provides selection of a back-end server, based on the client software. This may provide an initial selection of a server which may be refined with runtime statistics which may provide a more accurate decision making ability.

As aspect of the method may determine which server to connect to, to give optimal performance, based on analysis of the client application together with past experience statistics data which may be provided to the mapping or model of application operation classes to server characteristics. This has the aim of ensuring that the back-end server systems are used in the most productive manner possible.

As aspect of the method may include generating operation classifications of the application code before it executes, the classifications including non-functional factors, such as business priority level of application and using statistical methods to build up a model of which server system has the best response for a type of workload classification.

Figure 4:
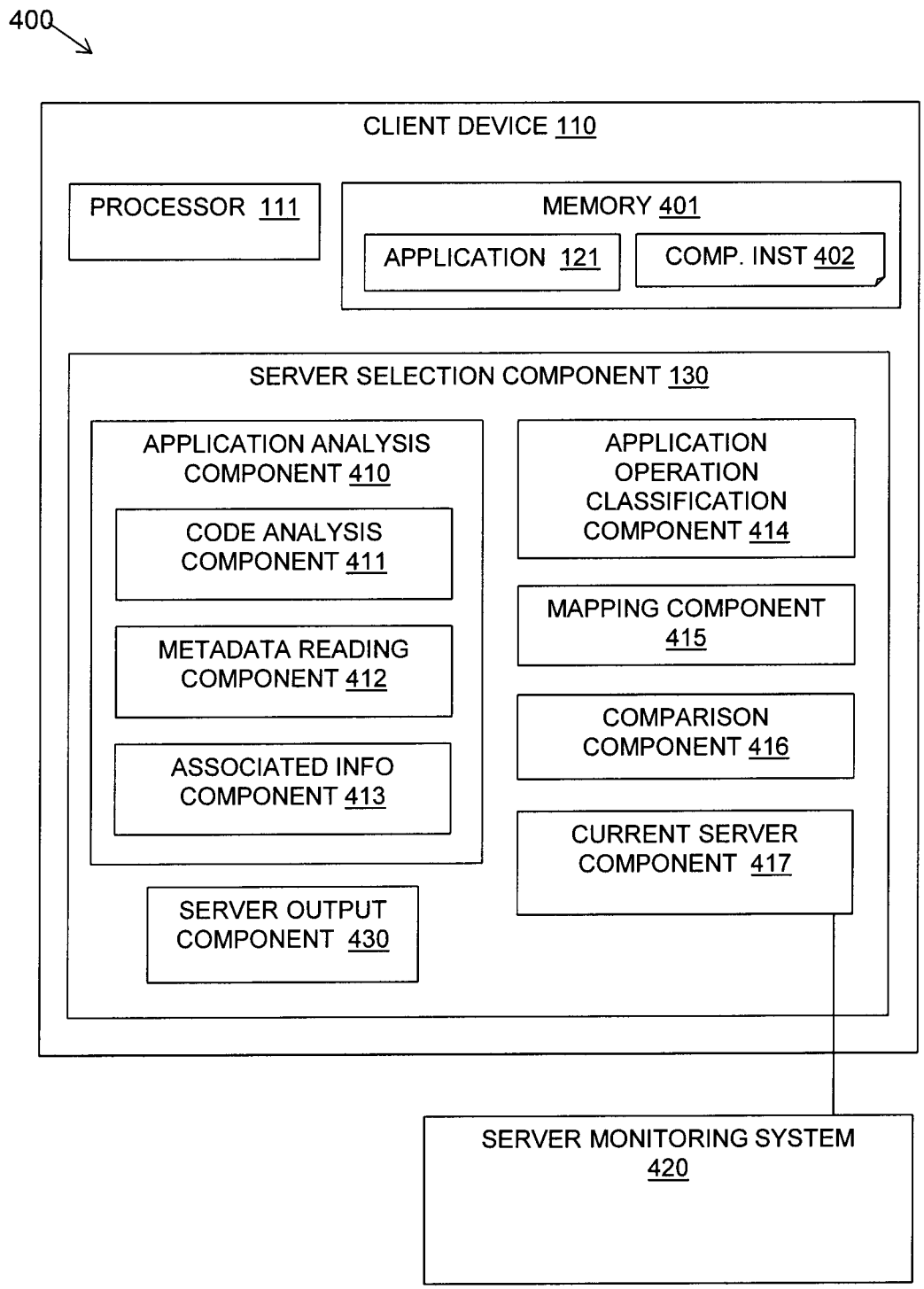
FIG. 4 is block diagram of an example embodiment of a system in accordance with one or more aspects of the present invention.

Referring to FIG. 4, a block diagram shows an embodiment of the described system 400. The system 400 includes a server selection component 130 provided at a client device 110. The client device 110 may include at least one processor 111, a hardware module, or a circuit for executing the functions of the described components which may be software units executing on the at least one processor. Memory 401 may be configured or arranged to provide computer instructions 402 to the at least one processor 111 to carry out the functionality of the components.

The client device 110 may include a server selection component 130. The server selection component 130 may be located locally at the client device 110 or may be accessed remotely from the client device 110. The server selection component 130 may analyze an application 121 which is provided at the client device 110 but which whose execution may include combinations of code and application programming interfaces (API) which execute on the client device 110 and other code and APIs that utilize one or more other computing devices, such as servers via a network (as shown in FIG. 1). The analysis of the application 121 enabling an intelligent selection of one or more available servers for executing the code and/or APIs which utilize server processing.

The server selection component 130 may include an application analysis component 410 which may analyze the application 121 before it is run and may include one or more of: a code analysis component 411 for analysis of the code of the application, a metadata reading component 412 for reading metadata or annotations provided in the application, and an associated information component 413 for referencing information associated with the application, such as service level agreements.

The server selection component 130 may include an application operation classification component 414 which may classify the operations of an application as output by the application analysis component 410. The operation classifications used may relate to the nature of the operations carried out, their characteristics, their business importance, their priority in terms of speed and accuracy, etc.

The server selection component 130 may include a mapping component 415 which may provide a mapping or modeling of application operation classes and server characteristics of currently available servers. The mapping component 415 may access a mapping data store 310 as described and shown in FIG. 3. The server selection component 130 may also include a comparison component 416 for comparing the output of the application analysis component 410 for an application 121 in the form of classified operations with the mapping component 415 to obtain an output of one more currently available servers having the characteristics for the application 121.

The server selection component 130 may include a current server component 417 for monitoring the availability and characteristics of servers in the network which are accessible to the client device 110. The current server component 417 may access a current server data store 320 as described in relation to FIG. 3. The current server component 417 may receive information from a remote server monitoring system 420 which may be available to all client devices 110 in the network. The server characteristics may be specific to the client device as they may include network connections with the servers and workload considerations; therefore, generalized server characteristics may be received from a remote server monitoring system 420 which are augmented at the client device by the current server component 417 based on the client-specific server characteristics which may be monitored at the client device.

The server selection component 130 may include a server output component 430 for outputting the result of the server selection based on the comparison component 416. A server routing table may be a construct of the described functionality associated with the application 121 and may be updated with the output of the server output component 430.

Once selected, a server instance may be indicated by a flag (e.g., a numerical value, a hierarchical indicator). In another embodiment, the priority of a server instance may be indicated by location of the server instance in a list or table.

The server instance selection may create or update a messaging server routing table. In an embodiment, a messaging server routing table is a semi-static entity that includes a list of servers and server instances utilized by a software application. In another scenario, a connection factory utility within an IDE may be used to create a messaging server routing table for a software application.

Embodiments provide the client device the ability to utilize capabilities of a messaging architecture to access the server's middleware to specify the execution of server-side operations of a software application to specific servers. In some embodiments, an application directs server-side operation by utilizing IP addresses of servers. Examples of messaging APIs include, put-message, get-message, browse-message, commit, and rollback.

Aspects of the described method and server further provide the client device the capability to quantify the responsiveness of various servers executing the server-side operations. Statistical analysis of server responsiveness provides a client device an "intelligent" method to select which server instance executes the server-side operations. Embodiments also recognize that not all server-side operations are equally important to the execution of a software application. The responsiveness to some server-side operations may be monitored. Other server-side operations may be weighted differently in a statistical analysis.

Embodiments may also provide the client device the capability of dynamically modifying the server instance selection and operation routing. The triggers for modifying server instance selection include threshold values that are applied to the historical, statistical server responsiveness data and compared to the currently monitored responsiveness data to reduce unnecessary modifications to the server instance selection. Server responsiveness can be monitored to various degrees of granularity. For example, server responsiveness can be monitored: at the application level, at the API level, or at a business logic level.

Embodiments also recognize that server responsiveness may vary with time or other factors. Modeling server responsiveness over longer periods can identify trends which may affect server instance selections. For example, long-term modeling may identify peak-usage periods and server maintenance periods. Modeling server responsiveness as a function of server metrics may identify server configurations (e.g., physical computing resources, virtualized computing resources, etc.) that provide improved responsiveness, improved transactional integrity, and/or are more cost-effective to utilization.

Further embodiments may respond to detecting that a new instance of a server (e.g., server replica) is on-line as opposed to just reacting to the loss of a server. For example, if a utilized type (e.g., hostname) of server is a VM and a new VM is provisioned with different resources, analysis of the metrics for the new VM may initiate a modification in server name selection without requiring the client device to obtain server responsiveness data.

Additional embodiments recognize that it may be advantageous to upload information obtained by the client device during the utilization of one or more aspects of the present invention. In one embodiment, uploading information, especially raw server responsiveness data, and storing the information on another device (e.g., a network-attached storage device) frees persistent storage space on the client device. In another embodiment, uploading information obtained during the utilization of one or more aspects of the present invention to another location accessible via the network permits other users that utilize the same applications to obtain the benefits of intelligent server selection by reducing or eliminating the time required to independently obtain statistically significant responsiveness data used in server instance selection. In yet another embodiment, permitting software developers and/or server owners access to application metrics, server metrics, and responsiveness data may improve: a software application, the quality of service for a software application, detecting server trends (e.g., utilization, peak periods, precursors to server failure, etc.), and server resource definition (e.g., allocations, provisioning, etc.).

In some embodiments, file storage at the client device may contain databases, log files, lists, images, etc., that support the applications of the client device. File storage may also include the statistical models associated with the applications. File storage may also include statistical models for the available servers. File storage may include models describing networking, queuing delays attributed to the network, and delays associated with the messaging infrastructure. In addition, file storage may include various application preferences utilized by embodiments, such as: threshold values, server selection criteria, and parameters utilized for statistics/modeling (e.g., moving average duration, sampling plans, etc.).

In some embodiments, a database may be provided as a central repository of information for application information (e.g., business logic, application metrics, API metrics, utilized resources, etc.), messaging server routing tables, channel definition tables, application version controls, server capabilities, server metrics, and statistical information (e.g., data) on the responsiveness of servers. In other embodiments, a database may be dedicated to server responsiveness information (e.g., raw responsiveness data, statistical analysis data, responsiveness models, etc.) and messaging server routing tables.

Figure 5:
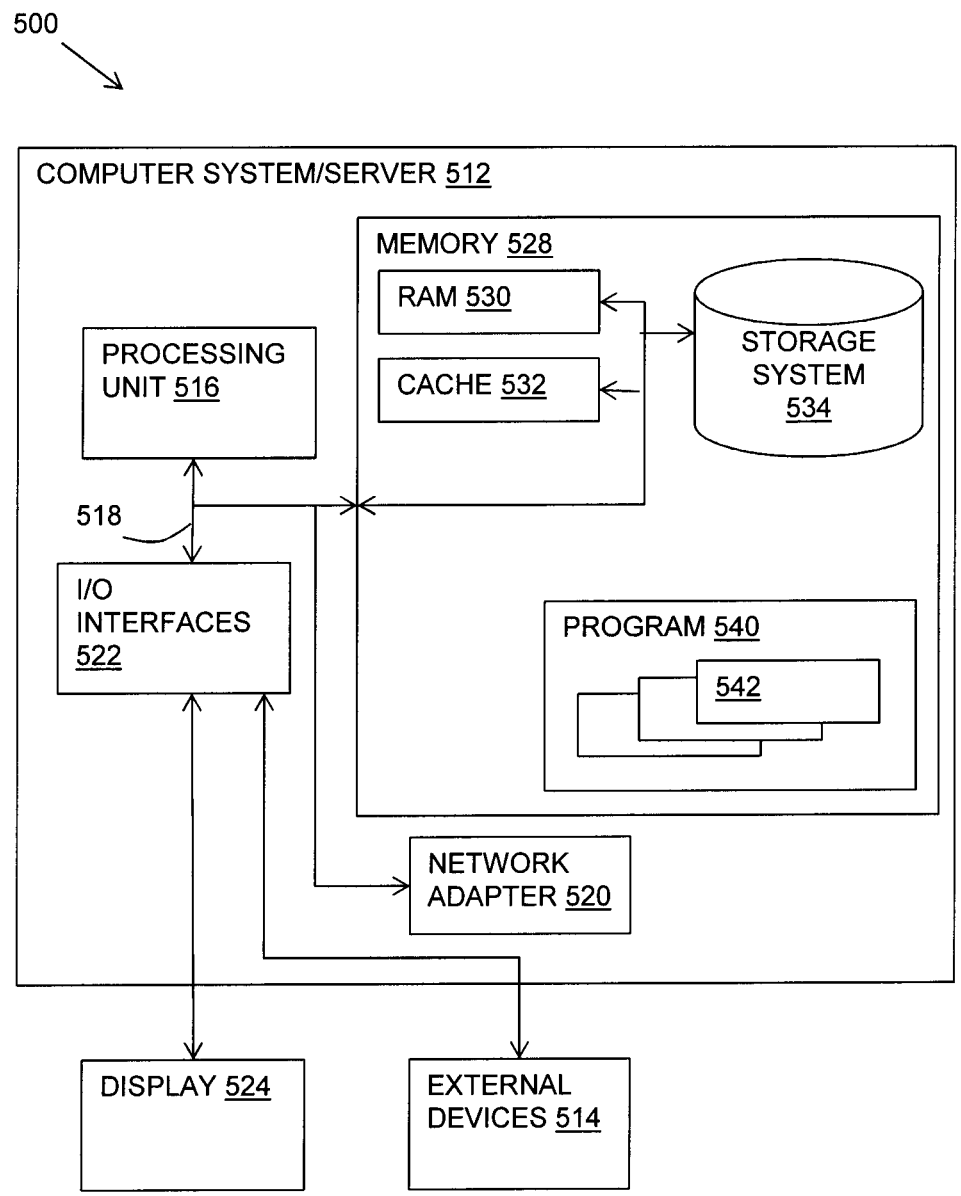
FIG. 5 is a block diagram of an embodiment of a computer system or cloud server in which one or more aspects of the present invention may be implemented.

Referring now to FIG. 5, a schematic of an example of a system 500 in the form of a computer system or server is shown.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

As described herein, according to one aspect of the present invention, there is provided a computer-implemented method for managing connections for execution of a client software application, the method carried out at a client device having a processor for executing the method, comprising: analyzing a client software application before execution of the application using code analysis of the application to determine one or more classifications of operations of the application; maintaining a mapping of application operation classifications to server characteristics suited to the application operation classifications; monitoring multiple servers currently available to process at least a portion of the client software application and characterizing each of the multiple servers according to their performance and resources; comparing the classifications of operations of the analyzed application to the characteristics of the multiple servers currently available using the mapping; and selecting a server based on the comparison.

Analyzing the client software application before execution of the application using code analysis may include one or more of: static code analysis, byte code analysis, code injection analysis, and application programing interface analysis. Analysis of an application before running using code analysis has the advantage that required server characteristics may be obtained before ahead of use and without input from an administrator.

Analyzing a client software application before execution of the application may additionally uses non-functional metadata analysis. The non-functional metadata analysis may include one or more of: analysis of deployment descriptors, analysis of source code annotations, and analysis of service level agreements. Analysis of non-functional metadata provides the additional advantage of enabling a developer or business administrator to influence server characteristics by adding appropriate non-function metadata.

Analyzing the client software application before execution may include interpreting the code to determine one or more classifications of functional operations of the application. Analyzing the client software application before execution may include using non-functional metadata analysis to determine one or more classifications of non-functional operations of the application.

The classifications of operations may include one or more of: a type of operation, a type of messaging required for the operations of the application, a security level of the operations, encryption and security used by the operations, business priority of the operations.

Monitoring multiple servers currently available to process at least a portion of the client software application may include receiving monitored statistics from a remote monitoring service and/or monitoring at the client device to include client-specific server characteristics. Monitoring multiple servers currently available to process at least a portion of the client software application may include maintaining statistics relating to multiple server characteristics, including using historical performance of a server to obtain statistics relating to the characteristics.

Maintaining a mapping of application operation classifications to server characteristics suited to the application operation classifications may include one or more of the group of mappings of: persistent messaging operations to servers with fast disk access; transactional messaging operations to similar servers; non-persistent messaging operations to high capacity network links; security or encryption operations to server dedicated security hardware; concurrent operations to servers with highly parallel processors; low priority business operations to systems with low redundancy; critical business operations to highly secure, scalable, high-performance servers.

Maintaining a mapping of application operation classifications to server characteristics suited to the application operation classifications may include configuring prioritization of server characteristics for applications with more than one operation classification.

The method may be provided as a software service in a cloud environment.

According to another aspect of the present invention, there is provided a system for managing connections for execution of a client software application, comprising: a processor and a memory configured to provide computer program instructions to the processor to execute the function of the components; an application analysis component for analyzing a client software application before execution of the application using code analysis of the application to determine one or more classifications of operations of the application; a mapping component for maintaining a mapping of application operation classifications to server characteristics suited to the application operation classifications; a current server component for monitoring multiple servers currently available to process at least a portion of the client software application and characterizing each of the multiple servers according to their performance and resources; a comparison component for comparing the classifications of operations of the analyzed application to the characteristics of the multiple servers currently available using the mapping; and a server output component for selecting a server based on the comparison.

The application analysis component may include a code analysis component for analyzing the client software application before execution of the application using code analysis including one or more of: static code analysis, byte code analysis, code injection analysis, and application programming interface analysis.

The application analysis component may also include a metadata reading component for analyzing a client software application before execution of the application using non-functional metadata analysis including one or more of: analysis of deployment descriptors, analysis of source code annotations, and analysis of service level agreements.

The application analysis component may further include interpreting the code and/or metadata to determine one or more classifications of operations of the application and wherein the analyzing relates to functional and non-functional, business aspects of the application.

The classifications of operations may include one or more of: a type of operation, a type of messaging required for the operations of the application, a security level of the operations, encryption and security used by the operations, business priority of the operations.

The current server component for monitoring multiple servers currently available to process at least a portion of the client software application may include receiving monitored statistics from a remote monitoring service and/or monitoring at the client device to include client-specific server characteristics.

The mapping component for maintaining a mapping of application operation classifications to server characteristics suited to the application operation classifications may include one or more of the group of mappings of: persistent messaging operations to servers with fast disk access; transactional messaging operations to similar servers; non-persistent messaging operations to high capacity network links; security or encryption operations to server dedicated security hardware; concurrent operations to servers with highly parallel processors; low priority business operations to systems with low redundancy; critical business operations to highly secure, scalable, high-performance servers.

The current server component may include maintaining statistics relating to multiple server characteristics and using historical performance of a server to obtain statistics relating to the characteristics.

The mapping component may include configuring prioritization of server characteristics for applications with more than one operation classification.

According to a further aspect of the present invention, there is provided a computer program product for managing connections for execution of a client software application, the computer program product comprising a computer readable storage medium having program instructions embodied therewith, the program instructions executable by a processor to cause the processor to: analyze a client software application before execution of the application using code analysis of the application to determine one or more classifications of operations of the application; maintain a mapping of application operation classifications to server characteristics suited to the application operation classifications; monitor multiple servers currently available to process at least a portion of the client software application and characterizing each of the multiple servers according to their performance and resources; compare the classifications of operations of the analyzed application to the characteristics of the multiple servers currently available using the mapping; and select a server based on the comparison.

The described aspects of the invention provide an advantage of, e.g., enabling client application requests to be sent to selected servers whose characteristics suit the application as determined by analysis of the application before it executes.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
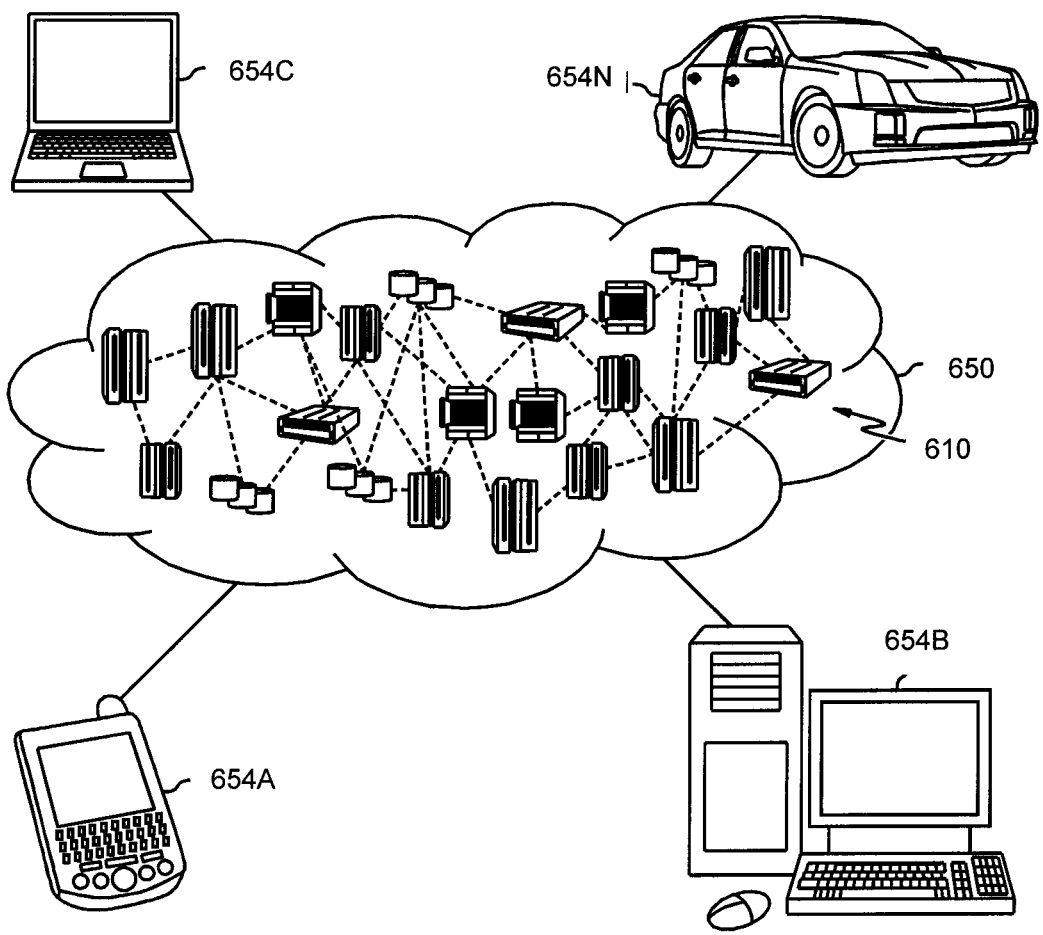
FIG. 6 is a schematic diagram of a cloud computing environment in which one or more aspects of the present invention may be implemented.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
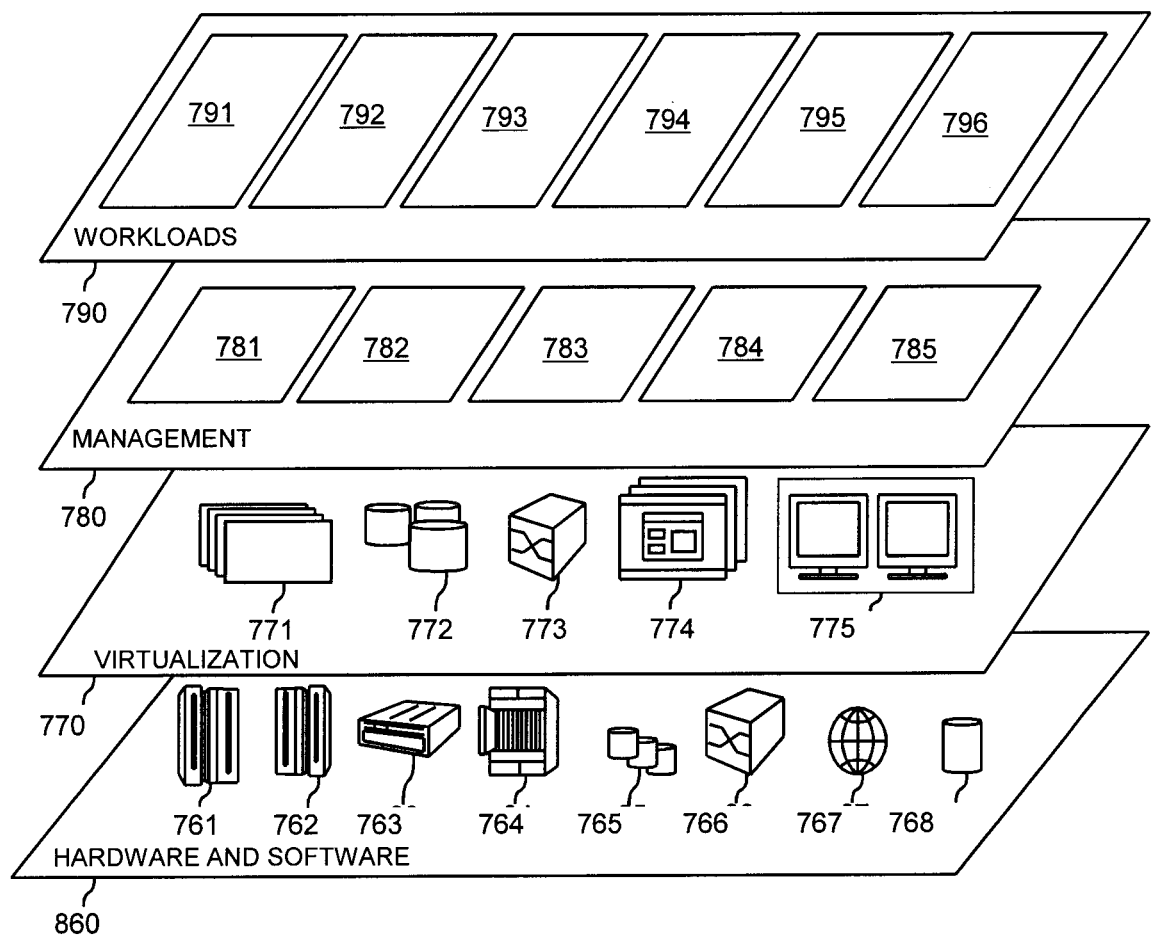
FIG. 7 is a diagram of abstraction model layers of a cloud computing environment in which one or more aspects of the present invention may be implemented.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and server selection processing 796 as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of aspects of the present invention.

What is claimed is:

1. A computer-implemented method of managing connections for execution of a client software application, the computer-implemented method comprising:
    generating, by one or more processors, one or more mappings of application operations classifications to server characteristics suited to the application operation classifications, wherein the generating comprises, for each server of a plurality available of servers:
        monitoring, by the one or more processors, performance and responsiveness of a server when executing the application operations, over a pre-defined period of time;
        identifying, by the one or more processors, the application operation classifications, based on analyzing source code of the client software application; and
        maintaining, by the one or more processors, a record comprising information and statistics relating to the server characteristics of the server, wherein the statistics are based on the monitoring and the identifying, wherein the information comprises linkages between application operation classifications of the application operations to the server characteristics of the server such that favorable server characteristics for application operation classifications are identified in the information, and wherein generating the one or more mappings further comprises configuring prioritization of server characteristics for applications with more than one application operation classification; and
    obtaining, by the one or more processors, from a client, a request to execute one or more operations of an application, wherein the request comprises classifications of the operations of the application;
    providing, by the one or more processors, to the client, at runtime, based on the one or more mappings, a given host server from the plurality available of servers; and
    executing, by the host server, the one or more operations of the application.

2. The computer-implemented method of claim 1, further comprising:
    storing, by the one or more processors, the one or more mappings in a mapping store.

3. The computer-implemented method of claim 2, wherein the mapping store comprises a database table with a key of a unique identifier for a server of the plurality available of servers.

4. The computer-implemented method as claimed in claim 1, wherein the analyzing includes one or more of: static code analysis, byte code analysis, code injection analysis, or application programing interface analysis.

5. The computer-implemented method of claim 1, wherein the one or more mappings includes mappings selected from the group consisting of: persistent messaging operations to servers with fast disk access, transactional messaging operations to similar servers, non-persistent messaging operations to high capacity network links, security or encryption operations to server dedicated security hardware, concurrent operations to servers with highly parallel processors, low priority business operations to systems with low redundancy, and critical business operations to highly secure, scalable, high-performance servers.

6. The computer-implemented method of claim 1, wherein generating the one or more mappings further comprises weighting, by the one or more processors, based on the monitoring, the server characteristics of the server.

7. The computer-implemented method of claim 1, wherein the plurality available of servers comprise servers of the given host.

8. The computer-implemented of claim 1, wherein the application operations classifications include one or more of: a type of operation, a type of messaging for the operations of the application, a security level of the operations, encryption and security used by the operations, or business priority of the operations.

9. A computer system for managing connections of execution of a client software application, the computer system comprising:
    a memory; and
    one or more processors in communication with the memory, wherein the computer system is configured to perform a method, said method comprising:
        generating, by the one or more processors, one or more mappings of application operations classifications to server characteristics suited to the application operation classifications, wherein the generating comprises, for each server of a plurality available of servers:
            monitoring, by the one or more processors, performance and responsiveness of a server when executing the application operations, over a pre-defined period of time;
            identifying, by the one or more processors, the application operation classifications, based on analyzing source code of the client software application; and
            maintaining, by the one or more processors, a record comprising information and statistics relating to the server characteristics of the server, wherein the statistics are based on the monitoring and the identifying, wherein the information comprises linkages between application operation classifications of the application operations to the server characteristics of the server such that favorable server characteristics for application operation classifications are identified in the information, and wherein generating the one or more mappings further comprises configuring prioritization of server characteristics for applications with more than one application operation classification; and obtaining, by the one or more processors, from a client, a request to execute one or more operations of an application, wherein the request comprises classifications of the operations of the application;

providing, by the one or more processors, to the client, at runtime, based on the one or more mappings, a given host server from the plurality available of servers; and executing, by the host server, the one or more operations of the application.

10. The computer system of claim 9, the method further comprising:

storing, by the one or more processors, the one or more mappings in a mapping store.

11. The computer system of claim 10, wherein the mapping store comprises a database tables table with a key of a unique identifier for a server of the plurality available of servers.

12. The computer system of claim 9, wherein the analyzing includes one or more of: static code analysis, byte code analysis, code injection analysis, or application programing interface analysis.

13. The computer system of claim 10, wherein the one or more mappings includes mappings selected from the group consisting of: persistent messaging operations to servers with fast disk access, transactional messaging operations to similar servers, non-persistent messaging operations to high capacity network links, security or encryption operations to server dedicated security hardware, concurrent operations to servers with highly parallel processors, low priority business operations to systems with low redundancy, and critical business operations to highly secure, scalable, high-performance servers.

14. The computer system of claim 11, wherein generating the one or more mappings further comprises weighting, by the one or more processors, based on the monitoring, the server characteristics of the server.

15. The computer system of claim 12, wherein the plurality available of servers comprise servers of the given host.

16. A computer program product for managing connections of execution of a client software application, the computer program product comprising:

a computer readable storage medium readable by a processing circuit and storing instructions for execution by the processing circuit for performing a method comprising:

generating, by the one or more processors, one or more mappings of application operations classifications to server characteristics suited to the application operation classifications, wherein the generating comprises, for each server of a plurality available of servers:

monitoring, by the one or more processors, performance and responsiveness of a server when executing the application operations, over a predefined period of time;

identifying, by the one or more processors, the application operation classifications, based on analyzing source code of the client software application; and maintaining, by the one or more processors, a record comprising information and statistics relating to the server characteristics of the server, wherein the statistics are based on the monitoring and the identifying, wherein the information comprises linkages between application operation classifications of the application operations to the server characteristics of the server such that favorable server characteristics for application operation classifications are identified in the information, and wherein generating the one or more mappings further comprises configuring prioritization of server characteristics for applications with more than one application operation classification; and obtaining, by the one or more processors, from a client, a request to execute one or more operations of an application, wherein the request comprises classifications of the operations of the application;

providing, by the one or more processors, to the client, at runtime, based on the one or more mappings, a given host server from the plurality available of servers; and executing, by the host server, the one or more operations of the application.

* * * * *